(12) United States Patent
Takeuchi et al.

(10) Patent No.: US 6,662,918 B2
(45) Date of Patent: Dec. 16, 2003

(54) TORQUE CONVERTER PROVIDED WITH LOCK-UP CLUTCH AND ARRANGED FOR EFFICIENT HEAT DISSIPATION

(75) Inventors: Hiroaki Takeuchi, Toyota (JP); Hisashi Watanabe, Aichi (JP); Masanori Iritani, Aichi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/224,479

(22) Filed: Aug. 21, 2002

(65) Prior Publication Data

US 2003/0042098 A1 Mar. 6, 2003

(30) Foreign Application Priority Data

Aug. 28, 2001 (JP) ......................................... 2001-257618

(51) Int. Cl.⁷ ..................... F16H 45/02; F16H 57/04
(52) U.S. Cl. ............... 192/3.29; 192/103 R; 192/109 F; 192/113.34
(58) Field of Search ........................... 192/3.29, 109 F, 192/3.28, 43.34, 3.3, 103 R; 477/62

(56) References Cited

U.S. PATENT DOCUMENTS

| | | | | |
|---|---|---|---|---|
| 5,566,802 | A | * 10/1996 | Kirkwood | 192/3.29 |
| 5,605,210 | A | * 2/1997 | Koike et al. | 192/3.29 |
| 5,799,260 | A | * 8/1998 | Droste et al. | 701/51 |
| 5,802,490 | A | * 9/1998 | Droste | 701/51 |
| 6,026,941 | A | * 2/2000 | Maienschein et al. | 192/3.29 |
| 6,099,435 | A | * 8/2000 | Halene et al. | 477/62 |
| 6,474,456 | B2 | * 11/2002 | Suzuki et al. | 192/3.29 |
| 6,497,312 | B1 | * 12/2002 | Sasse et al. | 192/3.29 |
| 6,547,051 | B2 | * 4/2003 | Yoshimoto et al. | 192/3.29 |

FOREIGN PATENT DOCUMENTS

| | | |
|---|---|---|
| DE | 198 51 384 | 5/2000 |
| JP | 2-80857 | 3/1990 |
| JP | 5-306742 | 11/1993 |
| JP | 2001-132819 | 5/2001 |

\* cited by examiner

Primary Examiner—Saul Rodriguez
(74) Attorney, Agent, or Firm—Oblon, Spivak, McClelland, Maier & Neustadt, P.C.

(57) ABSTRACT

A torque converter provided with a lock-up clutch and including a pump impeller, a turbine runner, a turbine hub, a stator, a clutch piston rotatable with the turbine runner and cooperating with the pump impeller to define an engaging chamber, a front cover cooperating with the clutch piston to define a releasing chamber and a friction member attached to the front cover, and wherein the lock-up clutch is placed in a slipping state for slipping engagement between the clutch piston and the front cover through the friction member, by a controlled difference between pressures of a working fluid in the engaging and releasing chambers, and the pump impeller and the stator cooperate to define of a first and a second fluid passage both of which communicate with the engaging chamber, while the stator and the turbine hub cooperate with each other to define the other of the first and second fluid passages, and wherein the lock-up clutch is brought into the slipping state with a supply flow of the fluid into the engaging chamber through the first fluid passage and a discharge flow of the fluid from the engaging chamber through the second fluid passage.

6 Claims, 3 Drawing Sheets

TORQUE CONVERTER PROVIDED WITH LOCK-UP CLUTCH AND ARRANGED FOR EFFICIENT HEAT DISSIPATION

This application is based on Japanese Patent Application Nos. 2001-257618 filed on Aug. 28, 2001, the contents of which are incorporated hereinto by reference.

BACKGROUND OF THE INVENTION

1. Field of the Invention

The present invention relates to a torque converter provided with a lock-up clutch and having an engaging chamber and a releasing chamber and which is operable with a difference between fluid pressures in the engaging and releasing chambers.

2. Discussion of Related Art

A lock-up clutch is operable in a partially engaged or slipping state. An amount of friction heat generated by the lock-up clutch operated in the slipping state is increased with an increase in the operating range of the lock-up clutch in its slipping state (the range in which a transmission torque or slipping speed of the lock-up clutch placed in the slipping state is controllable) The lock-up clutch suffers from a problem of shortening of an expected service life of a friction member due to thermal deterioration during its operation in the slipping state. To avoid this problem, there have been proposed various arrangements effective to reduce a temperature rise of the friction surface of the lock-up clutch.

For example, JP-A-2-80857 discloses a lock-up clutch wherein a clutch piston is provided with a friction member attached thereto, and has a cooling passage formed in a radially inner portion thereof relatively close to its axis of rotation, so that heat generated as a result of frictional contact of the clutch piston with a front cover through the friction member is dissipated through a working fluid which flows through the cooling passage. JP-A-2001-132819 discloses a lock-up clutch wherein a front cover is provided with a friction member attached thereto, and the surface of a clutch piston on the side of the friction member has a cooling passage formed in a radially inner or central portion thereof located radially inwardly of a radially outer portion thereof for frictional contact with the front cover through the friction member, so that a working fluid in an engaging chamber of the lock-up clutch flows through the cooling passage in a radially inward direction, so as to effectively cool the heat-generating surface of the lock-up clutch. Thus, the known lock-up clutch is cooled at its heat-generating portion by the working fluid, so that the operating range of the lock-up clutch placed in its slipping state can be made relatively large.

The lock-up clutch disclosed in JP-A-2-80857 in which the friction member is attached to the clutch piston, the front cover which generates heat due to its slipping contact or engagement with the friction member must be cooled by the ambient air whose coefficient of thermal conductivity (heat conductivity) is lower than that of the working fluid. Accordingly, the front cover cannot be efficiently cooled.

On the other hand, the lock-up clutch disclosed in JP-A-2001-132819 in which the friction member is attached to the front cover, the clutch piston which generates heat due to its slipping contact or engagement with the friction member can be cooled by the working fluid with a comparatively high degree of efficiency. However, this lock-up clutch wherein the clutch piston has the cooling passage may suffer from a problem of fluid leakage from the engaging chamber in the presence of the cooling passage. Namely, the working fluid may flow from the engaging chamber into the releasing chamber through the cooling passage, resulting in a decrease in the difference between the fluid pressures in the engaging and releasing chambers. Further, the cooling passage is required to have a relatively large diameter to assure a sufficiently high rate of flow of the working fluid therethrough as the cooling fluid. However, an increase in the diameter of the cooling passage undesirably reduces the pressure difference between the engaging and releasing chambers, leading to a decrease in the transmission torque of the lock-up clutch. In this respect, the rate of flow of the working fluid through the cooling passage is limited by the required transmission torque of the lock-up clutch. Thus, this lock-up clutch suffers from a problem that the rate of flow of the working fluid through the cooling passage cannot be made high enough to dissipate the generated heat, where the amount of the generated heat is large due to a large amount of slipping of the lock-up clutch, even where an input torque of the lock-up clutch is relatively small.

SUMMARY OF THE INVENTION

The present invention was made in the light of the background art discussed above. It is therefore an object of the present invention to provide a torque converter incorporating a lock-up clutch whose heat-generating portion can be efficiently cooled.

The object indicated above may be achieved according to the principle of the present invention, which provides a torque converter provided with a lock-up clutch and including a pump impeller, a turbine runner, a turbine hub, a stator, a clutch piston rotatable with the turbine runner and cooperating with the pump impeller to define therebetween an engaging chamber, a front cover cooperating with the clutch piston to define therebetween a releasing chamber, and a friction member attached to one of the clutch piston and the front cover, and wherein the lock-up clutch is placed in a slipping state for slipping engagement of the clutch piston and the front cover with each other through the friction member, by a controlled difference between pressures of a working fluid in the engaging and releasing chambers, characterized in that: the friction member is attached to the front cover; the pump impeller and the stator cooperate with each other to define therebetween one of a first fluid passage and a second fluid passage both of which communicate with the engaging chamber, while the stator and the turbine hub cooperate with each other to define therebetween the other of the first and second fluid passages; and the lock-up clutch is brought into the slipping state with a supply flow of the working fluid into the engaging chamber through the first fluid passage and a discharge flow of the working fluid from the engaging chamber through the second fluid passage.

In the torque converter of the present invention constructed as described above, the friction member is attached to the front cover, so that the clutch piston which generates heat due to frictional slipping contact or engagement with the friction member during an operation of the lock-up clutch in its slipping state can be cooled by the working fluid flowing through the engaging chamber. Further, the working fluid is circulated from the first fluid passage to the second fluid passage through the engaging chamber during the operation of the lock-up clutch in the slipping state, so that the clutch piston can be efficiently and effectively cooled.

The supply flow of the working fluid from the first fluid passage into the engaging chamber and a discharge flow of the fluid from the engaging chamber through the second fluid passage are consistent with the fluid flow for transmission of a rotary motion from the pump impeller to the turbine runner during an operation of the torque converter under load, that is, follows the fluid flow from the pump impeller toward the turbine runner and stator, so that the clutch piton can be effectively cooled by the flowing fluid.

Further, the working fluid does not leak from the engaging chamber, the lock-up clutch operated in the fully engaged or lock-up state does not suffer from a decrease in the torque transmission capacity due to the fluid leakage during its operation in the fully engaged or lock-up state.

According to one preferred form of the present invention, the lock-up clutch is brought into a fully engaged state for full engagement of the clutch piston with the front cover through the friction member, with the supply flow of the working fluid into the engaging chamber through the first fluid passage, while the discharge flow of the working fluid from the engaging chamber through the second fluid passage is prevented.

In the torque converter according to the above-indicated preferred form of the invention, the working fluid is not discharged from the second fluid passage during an operation of the lock-up clutch in the fully engaged state wherein no heat is generated. Accordingly, reduction of the fluid pressure in the engaging chamber in the fully engaged state is prevented, permitting the lock-up clutch to maintain the nominal torque transmission capacity.

In one advantageous arrangement of the above-indicated preferred form of the invention, the torque converter further includes a lock-up clutch control valve operable to control the difference between the pressures of the working fluid in the engaging and releasing chambers, and wherein the lock-up clutch control valve has a first position for permitting the discharge flow of the working fluid from the engaging chamber through the second fluid passage when the lock-up clutch is placed in the slipping state, and a second position for preventing the discharge flow when the lock-up clutch is placed in the fully engaged state.

In the above-indicated advantageous arrangement of the invention, the lock-up clutch control valve prevents the discharge flow of the fluid from the engaging chamber through the second fluid passage during an operation of the lock-up clutch in the fully engaged or lock-up state, and therefore eliminates a need of providing a valve exclusively used to prevent the fluid from being discharged from the engaging chamber through the second fluid passage when the lock-up clutch is placed in its fully engaged state.

According to another preferred form of the present invention, the torque converter further includes: a flow control device operable to control a rate of flow of the working fluid into the engaging chamber through the first fluid passage; slipping-speed calculating means for calculating a slipping speed of the lock-up clutch which is a difference between rotating speeds of the clutch piston and the front cover when the lock-up clutch is placed in the slipping state; engine-torque estimating means for estimating a torque of an engine connected to the front cover; and flow-rate adjusting means for controlling the flow control device to adjust the rate of flow of the working fluid into the engaging chamber through the first fluid passage, on the basis of the slipping speed calculated by the slipping-speed calculating means and the torque of the engine estimated by the engine-torque estimating means, and according to a predetermined relationship between the rate of flow and the slipping speed and the torque of the engine, the predetermined relationship being determined such that the rate of flow increases with at least one of the slipping speed and the toque of the engine. In this form of the invention, the flow-rate adjusting means controls the flow control device such that the rate of flow of the fluid through the first fluid passage into the engaging chamber changes with the amount of heat generated by the lock-up clutch operated in the slipping state, so that the clutch piston can be efficiently and effectively cooled.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which.

DETAILED DESCRIPTION OF THE PREFERRED EMBODIMENTS

Figure 1:
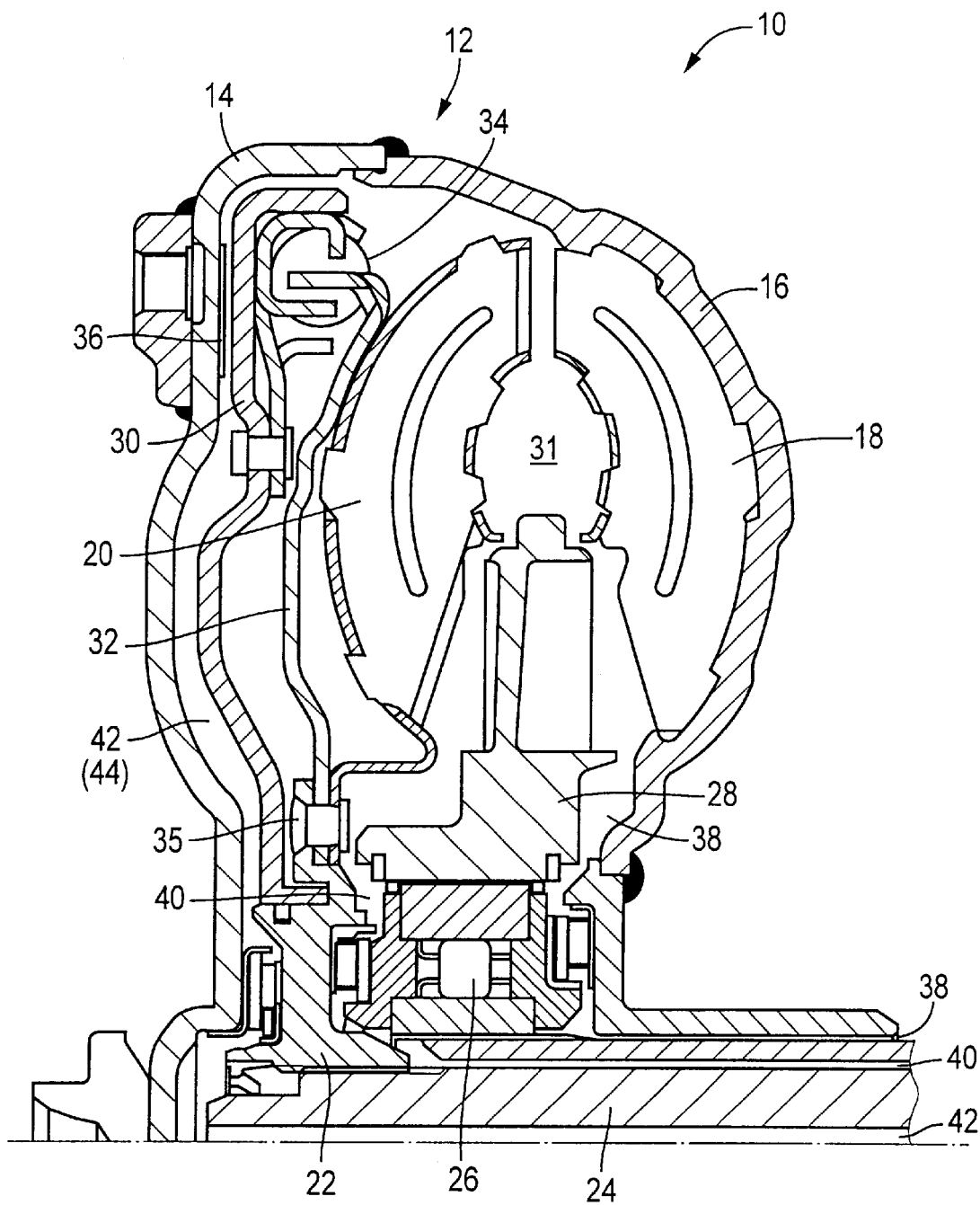
FIG. 1 is an elevational view in cross section showing a torque converter incorporating a lock-up clutch, which torque converter is constructed according to one embodiment of this invention.

Referring first to FIG. 1, there is shown a torque converter 10 which incorporates a lock-up clutch and which is constructed according to one embodiment of the present invention.

The torque converter 10 includes a covering member 12 which is rotated with a drive shaft (not shown). The drive shaft, which serves as an input member of the torque converter 10, is connected to a crankshaft of an engine (not shown) of an automotive vehicle, and is rotated by a drive torque of the engine. The covering member 12 consists of a front cover 14 located on the side of the engine (on the left side as seen in FIG. 1), and a rear cover in the form of a pump shell 16 located on the side of a transmission (on the right side as seen in FIG. 1). The front cover 14 and the pump shell 16 are welded together into the unitary covering member 12. The front cover 14 is a generally cylindrical member closed and open at its opposite axial ends, and the pump shell 16 is butted at its annular end face to the annular end face at the open axial end of the front cover 14 such that an our circumferential surface at the radially outer end portion of the pump shell 16 is held in abutting contact with an inner circumferential surface at the open axial end portion of the front cover 14.

Within an interior space of the covering member 12 filled with a working fluid, there are disposed a pump impeller 18 and a turbine runner 20 such that the pump impeller 18 and the turbine running 20 are opposed to each other. The pump impeller 18 is connected to the drive shaft indicated above, while the turbine runner 20 is connected through a turbine hub 22 to a driven shaft 24. When the pump impeller 18 is rotated by a rotary motion of the drive shaft, a rotary motion of the pump impeller 18 gives the working fluid a kinetic energy, causing a flow of the working fluid that gives the turbine running 20 a drive torque that causes a rotary motion of the driven shaft 24. Thus, a rotary motion of the engine is transmitted through the torque converter 10 to the transmission connected to the driven shaft 24.

Between the pump impeller 18 and the turbine runner 20, there is disposed a stator 28 which is rotatable in one direction through a one-way clutch 26. The working fluid flows from the turbine running 20 back to the pump impeller 18, along the stator 28.

Between the turbine runner 20 and the front cover 14, there is disposed a clutch piston 30 such that the clutch piston 30 is axially movable in the opposite directions toward and away from the front cover 14. The clutch piston 30 and the pump shell 16 cooperate to define therebetween an engaging chamber 31 provided to effect an engaging action of a lock-up clutch which includes the front cover 14, the clutch piston 30 and a friction member 36 (which will be described). Between the clutch piston 30 and the turbine runner 20, there is disposed a damper 32 which is connected at its radially outer portion to a radially outer portion of the clutch piston 30 through a coil spring 34, so that the clutch piston 30 and the damper 32 are rotated as a unit. The damper 32 is fixed at its radially inner portion to the turbine runner 20 and the turbine hub 22 through a rivet 35, so that a rotary motion of the damper 32 together with the clutch piston 30 causes a rotary motion of the turbine hub 22, and a rotary motion of the driven shaft 24 connected to the turbine hub 22.

The front cover 14 has a friction member 36 attached to an inner surface of a radially outer portion thereof, which is opposed to the clutch piston 30. The friction member 36 is formed of a material having a low coefficient of thermal conductivity, such as a material impregnated with a cellulose resin.

The pump impeller 18 and the stator 28 cooperate to define therebetween a first fluid passage 38, while the turbine hub 22 and the stator 28 cooperate to define therebetween a second fluid passage 40. The first and second fluid passages 38, 40 which communicate with the engaging chamber 31 are held in communication with each other through gaps including a gap left between the pump impeller 18 and the stator 28, and a gap left between the stator 28 and the turbine runner 20. Further, the front cover 14, turbine hub 22, clutch piston 30 and driven shaft 24 cooperate with each other to define a third fluid passage 42, which consists of a center hole formed through a radially central portion of the driven shaft 24 along its axis, a space between the front cover 14 and the turbine hub 22, and a space between the front cover 14 and the clutch piston 30. The latter space between the front cover 14 and the clutch piston 30 serves as a releasing chamber for effecting a releasing action of the lock-up clutch 14, 30, 36.

Figure 2:
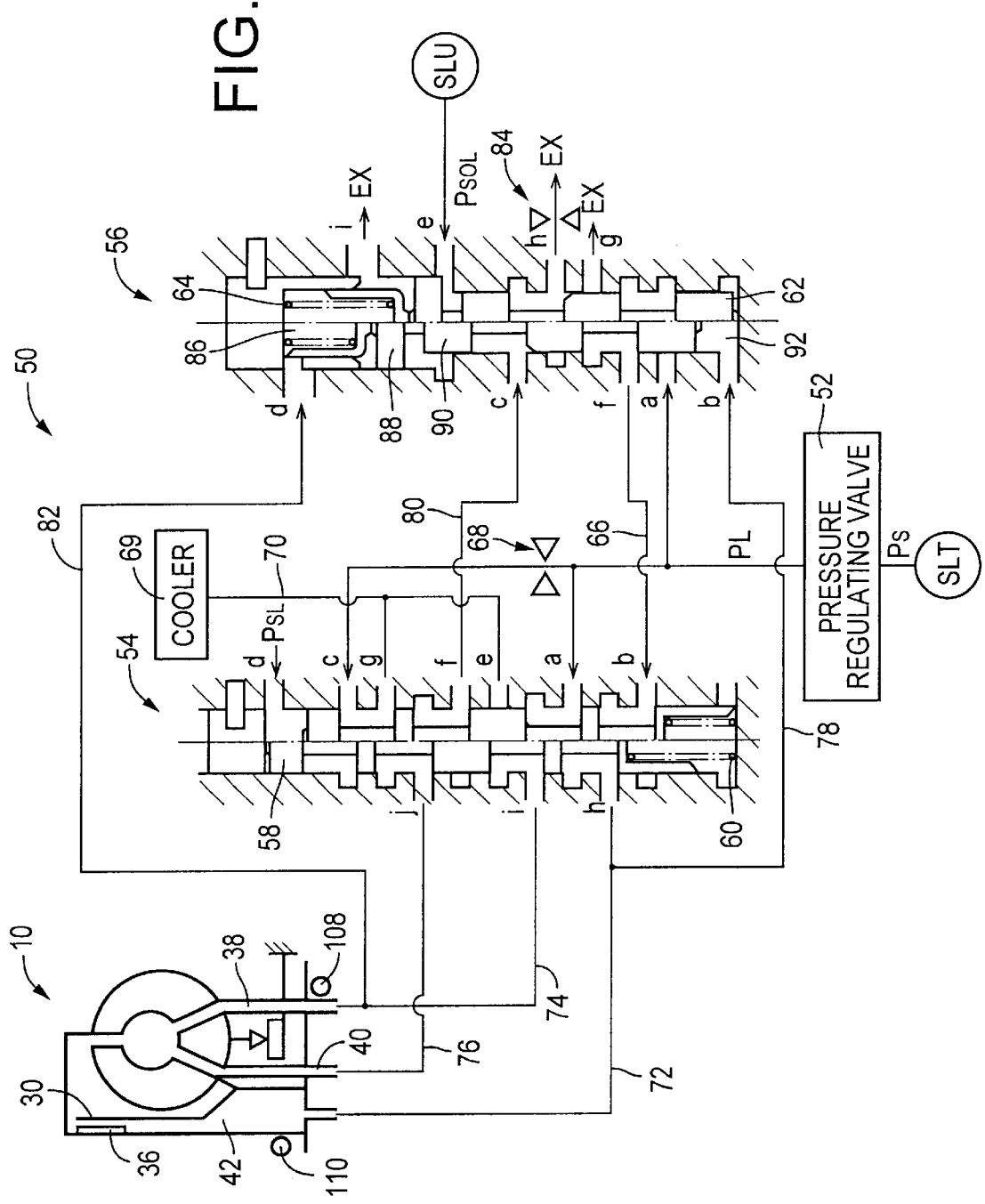
FIG. 2 is a view showing a portion of a hydraulic control circuit arranged to control hydraulic pressures of a working fluid within the torque converter.

The pressures of the working fluid in the first, second and third fluid passages 38, 40, 42 are controllable by a hydraulic control circuit 50 a major portion of which is shown in FIG. 2. Namely, the hydraulic control circuit 50 is provided to control the hydraulic pressures within the torque converter 10.

The hydraulic control circuit 50 includes a linear solenoid valve SLT arranged to generate a control pressure Ps corresponding to an opening angle of a throttle valve (not shown) of the engine. The hydraulic control circuit 50 further includes a pressure regulating valve 52 which receives the control pressure Ps and is arranged to generate a line pressure PL proportional to the control pressure Ps. The hydraulic control circuit 50 further includes a lock-up clutch switching valve 54 and a lock-up clutch control valve 56. The line pressure PL generated by the pressure regulating valve 52 is applied to an input port "a" of each of the lock-up clutch switching and control valves 54, 56.

The lock-up clutch switching valve 54 has input ports "a", "b", "c" and "d", output ports "e", "f" and "g", input-output ports "h", "i" and "j", a spool 58, and a spring 60. The lock-up clutch control valve 56 has input ports "a", "b", "c", "d" and "e", output ports "f", "g", "h" and "i", a spool 62, and a spring 64.

In the lock-up clutch switching valve 54, the input port "a" receives the line pressure PL as generated by the pressure regulating valve 52, as indicated above, and the input ports "b", "c" and "d" respectively receive: a hydraulic pressure from the output port "f" of the lock-up clutch control valve 56 through a fluid passage 66; the line pressure PL as reduced by an orifice 68; and a control pressure $P_{SL}$ generated by a linear solenoid valve DSL (not shown). Further, the output ports "e" and "g" are held in communication with a cooler 69 through a fluid passage 70, and the input-output ports "h", "i" and "j" are respectively held in communication with: the third fluid passage 42 of the torque converter 10 through a fluid passage 72; the first fluid passage 38 of the torque converter 10 through a fluid passage 74; and the second fluid passage 40 of the torque converter 10 through a fluid passage 76.

When the control pressure $P_{SL}$ generated by the solenoid valve DSL is applied to the input port "d" of the lock-up clutch switching valve 54, the spool 58 is placed in a position in which the spring 60 is compressed by the largest amount. In this position of the spool 58, the input ports "a", "b" and "c" are communicated with the input-output port "i", input-output port "h" and output port "g", respectively, and the output port "f" is communicated with the input-output port "j", while the output port "e" is closed. When the control pressure $P_{SL}$ is not applied to the input port "d", the spool 58 is placed in a position in which the input port "a" and the output ports "e" and "g" are communicated with the input-output ports "h", "i" and "j", respectively, and the input port "b" and the output port "f" are closed, while the input port "c" and the output port "g" are disconnected from each other.

In the lock-up clutch control valve 56, the input port "a" receives the line pressure PL as generated by the pressure regulating valve 52, as indicated above, and the input ports "b", "c" and "d" are respectively connected to: a fluid passage 78 held in communication with the fluid passage 72; the output port "f" of the lock-up clutch switching valve 54 through a fluid passage 80; and a fluid passage 82 held in communication with the fluid passage 74. Further, the input port "e" receives the control pressure $P_{SOL}$ generated by the linear solenoid valve SLU, and the output port "f" is held in communication with the input port "b" of the lock-up clutch switching valve 54 through the fluid passage 66. The output ports "g" and "j" are directly exposed to the atmosphere, while the output port "h" is exposed to the atmosphere through an orifice 84.

When the control pressure $P_{SOL}$ generated by the linear solenoid valve SLU is applied to the input port "e" of the lock-up clutch control valve 56, the spool 62 is placed in a position in which the spring 64 is elongated by the largest amount. In this position of the spool 62, the input ports "a", "c" and "d" are communicated with the output ports "f" and "h" and a spring-accommodating space 86 of the spool 62, respectively, respectively, and the input port "b" and the output port "g" are closed. When the control pressure $P_{SOL}$ is not applied to the input port "e", the spool 62 is moved in a direction of compression of the spring 64 due to a difference between pressure-receiving areas of two lands 88, 90 of the spool 62. As a result, the spool 62 is eventually placed in a position in which the spring 64 is compressed by the largest amount. In this position of the spool 62, the input port "a" is closed, and the pressurized fluid fed to the input port "b" through the fluid passage 78 is introduced into a fluid-accommodating space 92 formed in an axial end portion of the spool 62 remote from the spring 64. Further, the input port "c" and the output port "h" are disconnected from each other, and the input port "d" and the spring-accommodating space 86 are disconnected from each other, while the output ports "f" and "g" are communicated with each other, and the output port "h" is closed.

Then, an operation of the hydraulic control circuit 50 of FIG. 2 will be described. Initially, a releasing action of the lock-up clutch 14, 30, 36 will be described. The releasing action is effected to place the lock-up clutch in a fully released state in which the clutch piston 30 and the front cover 14 of the torque converter 10 are spaced apart from each other. To effect the releasing action of the lock-up clutch, the control pressure $P_{SL}$ is removed from the input port "d" of the lock-up clutch switching valve 54, and the control pressure $P_{SOL}$ is removed from the input port "e" of the lock-up clutch control valve 56. In the absence of the control pressure $P_{SL}$ at the input port "d" of the lock-up clutch switching valve 54, the spool 58 is held in the fully elevated position (position of the left half as shown in FIG. 2) under a biasing action of the spring 60. In the absence of the control pressure $P_{SOL}$ at the input port "e" of the lock-up clutch control valve 56, the spool 62 is held in its fully lowered position (position of the right half as shown in FIG. 2) under a biasing force of the spring 64.

When the spools 58 and 62 of the lock-up clutch switching valve 54 and the lock-up clutch control valve 56 are placed in the fully elevated and lowered positions, respectively, as described above, the line pressure PL is applied to the input port "a" of the lock-up clutch switching valve 54, and is applied to the third fluid passage 42 of the torque converter 10 through the input-output port "h" and the fluid passage 72. At this time, the input-output ports "i" and "j" of the lock-up clutch switching valve 54 are held in communication with the respective output ports "e" and "g" which are connected to the cooler 69, so that the fluid pressure in the first fluid passage 38 communicating with the input-output port "i" of the switching valve 54 through the fluid passage 74 and the fluid pressure in the second fluid passage 40 communicating with the input-output port "j" through the fluid passage 76 are both equal to that in the cooler 69. Namely, the fluid pressure in the third fluid passage 42 and the releasing chamber 44 is higher than that in the first and second fluid passages 38, 40 and the engaging chamber 31, so that the clutch piston 30 is spaced apart from the friction member 36 (front cover 14), and is placed in the fully released state.

There will next be described an engaging action of the lock-up clutch 14, 30, 36. The engaging action is effected to place the lock-up clutch in a fully engaged state (lock-up state) in which the clutch piston 30 and the front cover 14 of the torque converter 10 are held in full engagement with each other. To effect the engaging action of the lock-up clutch, the control pressure $P_{SL}$ is applied to the input port "d" of the lock-up clutch switching valve 54, and the control pressure $P_{SOL}$ is applied to input port "e" of the lock-up clutch control valve 56. In the presence of the control pressure $P_{SL}$ at the input port "d" of the lock-up clutch switching valve 54, the spool 58 is placed in the lowered position (position of the right half as shown in FIG. 2). In the presence of the control pressure PSOL at the input port "e" of the lock-up clutch control valve 56, the spool 62 is placed in its fully elevated position (position of the left half as shown in FIG. 2) under a biasing force of the spring 64.

When the spools 58 and 62 of the lock-up clutch switching and control valves 54, 56 are placed in the fully lowered and elevated positions, respectively, as described above, the line pressure PL applied to the input port "a" of the lock-up clutch switching valve 54 is applied to the first fluid passage 38 through the input-output port "i" and the fluid passage 74. At this time, the second fluid passage 40 is held in communication with the fluid passage 76, the input-output port "j" and output port "f" of the lock-up clutch switching valve 54, the fluid passage 80, and the input port "c" of the lock-up clutch control valve 56, but the input port "c" of the control valve 56 is not held in communication with the other ports of the control valve 56, so that the fluid pressure in the second fluid passage 40 is equal to that in the first fluid passage 38. Since the input-output port "h" of the lock-up clutch switching valve 54 is held in communication with the input port "b", the third fluid passage 42 communicating with the input-output port "h" of the switching valve 54 through the fluid passage 72 is held in communication with the output port "f" of the lock-up clutch control valve 56 through the switching valve 54. Since the output port "f" of the control valve 56 is held in communication with the output port "g" exposed to the atmosphere, the fluid pressure in the third fluid passage 42 is equal to the atmospheric pressure. Accordingly, the fluid pressure in the third fluid passage 42 and the releasing chamber 44 is lower than that in the first and second fluid passages 38, 40 and the engaging chamber 31, so that the clutch piston 30 is brought into engagement with the friction member 36 due to the fluid pressure difference between the releasing and engaging chambers 42, 31. Thus, the lock-up clutch 14, 30, 36 is placed in the fully engaged state.

As described above, the lock-up clutch 14, 30, 36 is brought to its fully engaged or lock-up state, by applying the control pressure $P_{SL}$ to the input port "d" of the lock-up clutch switching valve 54 to place the spool 58 in the fully lowered position (position of the right half as shown in FIG. 2), and by applying the control pressure $P_{SOL}$ to the input port "e" of the lock-up clutch control valve 56 to place the spool 62 in the fully elevated position (position of the left half as shown in FIG. 2). By controlling the control pressure $P_{SOL}$ applied to the input port "e" of the control valve 56 while holding the switching valve 54 in the fully lowered position, the lock-up clutch 14, 30, 36 can be placed in a partially engaged or slipping state in which the clutch piston 30 and the friction member 36 are held in slipping engagement with each other. The slipping state of the lock-up clutch will be described next.

When the control pressure $P_{SOL}$ of the linear solenoid valve SLU is not applied to the input port "e" of the lock-up clutch control valve 56, the spool 62 of the control valve 56 is held in its fully lowered position under the biasing action of the spring 64. In this fully lowered position, the line pressure PL applied to the input port "a" of the control valve 56 is applied to the third fluid passage 42 through the output port "f", fluid passage 66, input port "b" and input-output port "h" of the switching valve 54, and fluid passage 72. At the same time, the line pressure PL is applied to the first and second fluid passages 38, 40. Accordingly, the fluid pressure difference on the opposite sides of the clutch piston 30 is zero, so that the clutch piston 30 is spaced apart from the friction member 36, that is, the lock-up clutch is placed in the fully released state, disabling the lock-up clutch to transmit an input torque to the driven shaft 24.

When the control pressure $P_{SOL}$ applied to the input port "e" of the lock-p clutch control valve 56 is increased, the spool 62 is moved in the upward direction while reducing the amount of opening of the input port "a", thereby reducing the line pressure PL, so that the reduced line pressure PL is applied to the output port "f" of the control valve 56. Since this output port "f" is held in communication with the third fluid passage 42 through the lock-up clutch switching valve 54 and the fluid passage 72, the line pressure PL applied to the third fluid passage 42 is also reduced. On the other hand, the line pressure PL is applied to the first fluid passage 38 through the input port "a" and the input-output port "i" of the switching valve 54, so that there arises a fluid pressure difference between the first and third fluid passages 38, 42 (namely, a difference between the line pressure PL and the fluid pressure at the output port "f" of the control valve 56), which pressure difference causes the clutch piston 30 to be brought into slipping engagement with the friction member 36, permitting the lock-up clutch 14, 30, 36 to transmit a drive torque to the driven shaft 24. The amount of the drive torque to be transmitted to the driven shaft 24 can be controlled by controlling the control pressure $P_{SOL}$ to be applied to the input port "e" of the lock-up clutch control valve 56.

While the clutch piston 30 is in a slipping engagement with the friction member 36 as described above, the working fluid fed into the engaging chamber 31 through the first fluid passage 38 is discharged from the engaging chamber 31 through the second fluid passage 40, fluid passage 76, input-output port "j" and output port "f" of the switching valve 54, fluid passage 80, and input port "c" and output port "h" of the control valve 56. This discharge flow of the fluid causes dissipation of heat generated by the slipping engagement of the clutch piston 30 and the friction member 36. It is noted that the orifice 84 is provided to maintain the fluid pressure within the torque converter 10, and a rate Q of flow of the fluid through the orifice 84 can be adjusted by controlling the line pressure PL generated by the pressure regulating valve 52. It will be understood that the pressure regulating valve 52 and the linear solenoid valve SLT provided to apply the control pressure Ps to the pressure regulating valve 52 cooperate with each other to constitute a flow control device.

When the spool 56 of the lock-up clutch control valve 56 is moved to its fully elevated position with a further increase of the control pressure $P_{SOL}$ applied to the input port "e", the lock-up clutch 14, 30, 36 is brought to its fully engaged or lock-up state in which the input port "c" and the output port "h" of the lock-up control valve 56 are not held in communication with each other, preventing a discharge flow of the working fluid from the engaging chamber 31. This arrangement is based on a fact that heat is not generated by the lock-up clutch 14, 30, 36 when it is placed in the fully engaged or lock-up state. When the working fluid is not discharged from the output port "h" of the control valve 56, the fluid pressure difference between the first and second fluid passages 38, 40 is zero, so that the fluid pressure difference on the opposite side of the clutch piston 30 is increased, resulting in an increase in the torque transmission capacity of the torque converter 10.

Figure 3:
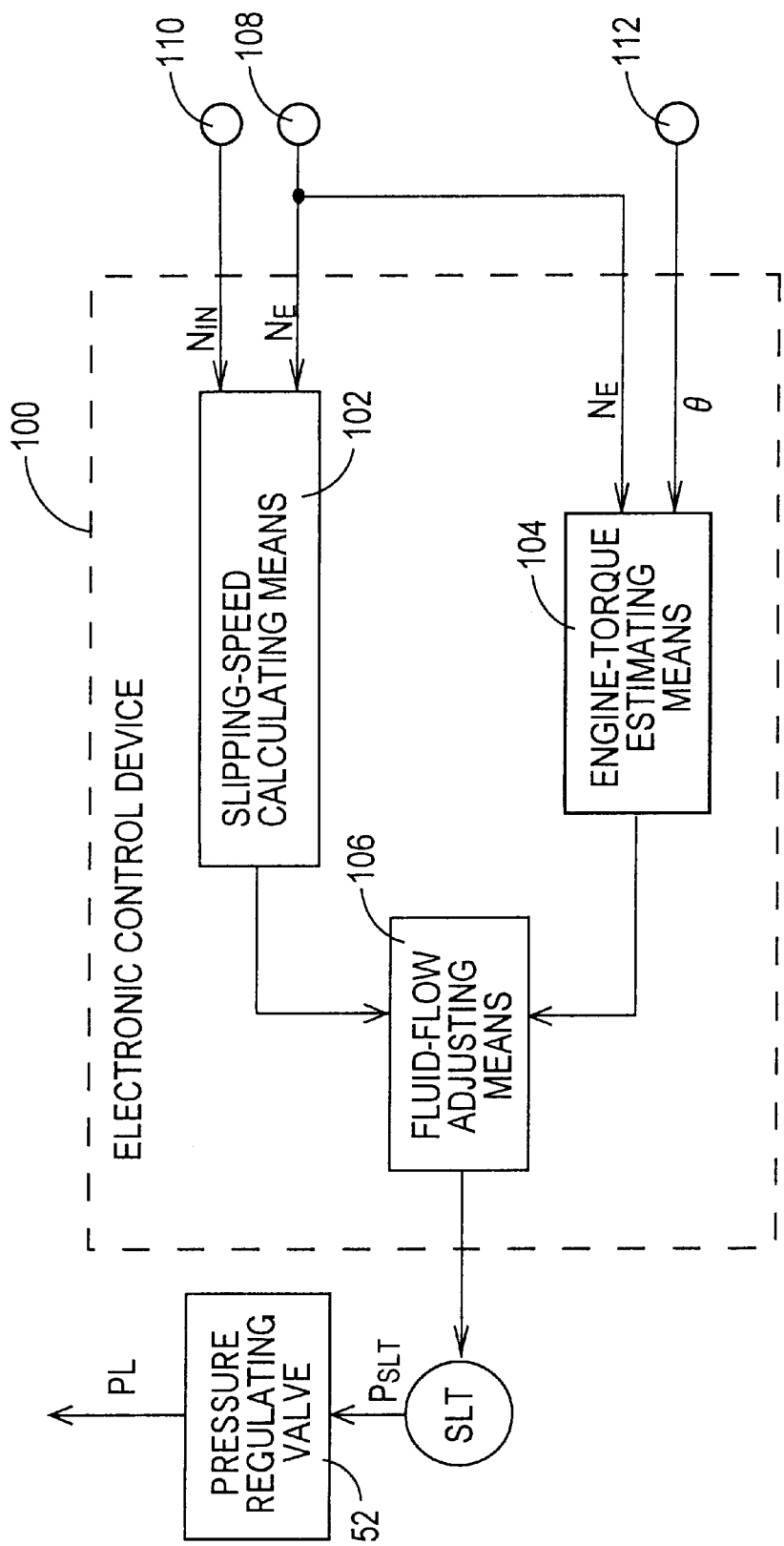
FIG. 3 is a block diagram schematically illustrating major functional means of an electronic control device for controlling the hydraulic control circuit of FIG. 2.

Referring next to the block diagram of FIG. 3, there is illustrated functional means of an electronic control device 100 provided in the hydraulic control circuit 50. The electronic control device 100 includes slipping-speed calculating means 102, engine-torque estimating means 104 and fluid-flow adjusting means 106.

The slipping-speed calculating means 102 is arranged to calculate a slipping speed $N_S$ of the lock-up clutch 14, 30, 36, that is, a difference between rotating speeds of the front cover 14 and the clutch piston 30, on the basis of a rotating speed $N_E$ (r.p.m.) of the engine as detected by an engine speed sensor 108 and a rotating speed $N_{IN}$ (r.p.m.) of the driven shaft 24 as detected by a driven-shaft speed sensor 110. Namely, the rotating speed of the front cover 14 is equal to the engine speed $N_E$, while the rotating speed of the clutch piston 30 is equal to the speed $N_{IN}$ of the driven shaft 24. Accordingly, the slipping-speed calculating means 102 can calculate the slipping speed $N_S$ by subtracting the rotating speed $N_{IN}$ of the driven shaft 24 from the engine speed $N_E$.

The engine-torque estimating means 104 is arranged to estimate a torque $T_E$ of the engine, on the basis of the engine speed $N_E$ detected by the engine speed sensor 108 and the opening angle θ of the throttle valve (not shown) of the engine detected by a throttle-opening sensor 112, and according to a predetermined relationship between the engine torque TE and the engine speed $N_E$ and throttle opening angle θ. The predetermined relationship is represented by a data map or equation stored in the electronic control device 100.

The fluid-flow adjusting means 106 is arranged to determine a rate of flow of the working fluid through the first fluid passage 38 into the engaging chamber 31 of the torque converter 10, on the basis of the slipping speed $N_S$ calculated by the slipping-speed calculating means 120 and the engine torque $T_E$ estimated by the engine-torque estimating means 104, and according to a predetermined relationship between the rate of flow and the slipping speed $N_S$ and engine torque $T_E$. This predetermined relationship, which is represented by a data map or equation stored in the electronic control device 100, is formulated such that the rate of flow increases with an increase in the slipping speed $N_S$ and/or engine torque $T_E$. In this respect, it is noted that the amount of heat generated by the slipping engagement between the clutch piston 30 and the friction member 36 is proportional to the slipping speed $N_S$ and the engine speed $T_E$. Accordingly, the rate of flow of the working fluid into the engaging chamber 31 through the firsts fluid passage 38, which is determined by the fluid-flow adjusting means 106 is sufficient to dissipate the amount of heat generated. The fluid-flow adjusting means 106 is further arranged to determine the line pressure PL required to produce the determined rate of flow of the fluid into the engaging chamber 31 through the first fluid passage 38, on the basis of the determined rate of flow and according to a predetermined relationship between the line pressure PL and the rate of flow. This relationship is also represented by a data map or equation stored in the electronic control device 100. The fluid-flow adjusting means 106 controls the linear solenoid valve SLT, so as to cause the pressure regulating valve 52 to generate the determined line pressure PL. The transmission torque of the lock-up clutch 14, 30, 36 is not influenced by an adjustment of the line pressure PL in the slipping state of the lock-up clutch, since the transmission torque depends on a pressure difference between the line pressure PL and the pressure at the output port "f" of the lock-up clutch control valve 56, and since the line pressure PL is considerably high with respect to the pressure difference.

In the torque converter 10 constructed according to the present embodiment as described above, the friction member 36 is attached to the front cover 14, the clutch piston 30 which generates heat due to frictional slipping contact with the friction member 36 can be cooled by the working fluid within the engaging chamber 31 while the lock-up clutch 14, 30, 36 is operating in the slipping state. Further, the working fluid is circulated from the first fluid passage 38 to the second fluid passage 40 during the operation of the lock-up clutch in the slipping state, so that the clutch piston 30 can be efficiently and effectively cooled.

The working fluid for cooling the clutch piston 30 flows between the first and second fluid passages 38, 40 both communicating with the engaging chamber 31, so that the rate of flow of the fluid through the engaging chamber 31 is not influenced by the difference between the fluid pressures in the engaging and releasing chambers 31, 44, that is, is not influenced by the transmission torque of the lock-up clutch 14, 30, 36, whereby the rate of flow of the fluid can be controlled so as to correspond to the amount of heat generated.

A supply flow of the working fluid from the first fluid passage 38 into the engaging chamber 31 and a discharge flow of the fluid from the engaging chamber 31 through the second fluid passage 40 are consistent with the fluid flow for transmission of a rotary motion from the pump impeller 18 to the turbine runner 20 during an operation of the torque converter 10 under load, that is, follows the fluid flow from the pump impeller 18 toward the turbine runner 20 and stator 28, so that the clutch piton 30 can be effectively cooled by the flowing fluid.

Further, the working fluid does not leak from the engaging chamber 31, the lock-up clutch 14, 30, 36 operated in the fully engaged or lock-up state does not suffer from a decrease in the torque transmission capacity due to the fluid leakage during its operation in the fully engaged or lock-up state.

The present embodiment is further arranged such that the working fluid is not discharged from the second fluid passage 40 during an operation of the lock-up clutch 14, 30, 36 in the fully engaged state wherein no heat is generated. Accordingly, reduction of the fluid pressure in the engaging chamber 31 in the fully engaged state is prevented, permitting the lock-up clutch to maintain the nominal torque transmission capacity.

The present embodiment is further arranged such that the lock-up clutch control valve 56 prevents a discharge flow of the fluid from the engaging chamber 31 through the second fluid passage 40 during an operation of the lock-up clutch 14, 30, 36 in the fully engaged or lock-up state, and therefore eliminates a need of providing a valve exclusively used to prevent the fluid from being discharged from the engaging chamber 31 through the second fluid passage 40 when the lock-up clutch is placed in the fully engaged state.

The present embodiment is further arranged such that the flow-rate adjusting means 106 controls the linear solenoid valve SLT such that the rate of flow of the fluid through the first fluid passage 38 into the engaging chamber 38 changes with the amount of heat generated by the lock-up clutch 14, 30, 36 operated in the slipping state, so that the clutch piston 30 can be efficiently and effectively cooled.

While one embodiment of this invention has been described above by reference to the accompanying drawings, for illustrative purpose only, it is to be understood that the invention may be otherwise embodied.

In the illustrated embodiment, the pump impeller 18 and the stator 28 define therebetween the first fluid passage 38, while the stator 28 and the turbine hub 22 define therebetween the second fluid passage 40, so that the working fluid flows from the first fluid passage 38 into the second fluid passage 40 through the engaging chamber 31. However, the torque converter 10 may be modified such that the stator 28 and the turbine hub 22 define therebetween a first fluid passage, while the pump impeller 18 and the stator 28 define therebetween a second fluid passage, so that the fluid flows from the first fluid passage into the second fluid passage through the engaging chamber 31.

Although the orifice 84 is disposed downstream of the output port "h" of the lock-up clutch control valve 56, the fluid passage 80 may be provided with the orifice 84.

It is to be understood that the present invention may be embodied with various other changes, modifications and improvements which may occur to those skilled in the art, without departing from the spirit and scope of the present invention defined in the appended claims.

What is claimed is:

1. A torque converter provided with a lock-up clutch and including a pump impeller, a turbine runner, a turbine hub, a stator, a clutch piston rotatable with said turbine runner and cooperating with said pump impeller to define therebetween an engaging chamber, a front cover cooperating with said clutch piston to define therebetween a releasing chamber, and a friction member attached to one of said clutch piston and said front cover, and wherein said lock-up clutch is placed in a slipping state for slipping engagement of said clutch piston and said front cover with each other through said friction member, by a controlled difference between pressures of a working fluid in said engaging and releasing chambers, wherein an improvement comprises:

said friction member being attached to said front cover;

said pump impeller and said stator cooperating with each other to define therebetween one of a first fluid passage and a second fluid passage both of which communicate with said engaging chamber, while said stator and said turbine hub cooperating with each other to define therebetween the other of said first and second fluid passages; and said lock-up clutch being brought into said slipping state with a supply flow of the working fluid into said engaging chamber through said first fluid passage and a discharge flow of the working fluid from said engaging chamber through said second fluid passage.

2. A torque converter according to claim 1, wherein said lock-up clutch is brought into a fully engaged state for full engagement of said clutch piston with said front cover through said friction member, with said supply flow of the working fluid into said engaging chamber through said first fluid passage, while said discharge flow of the working fluid from said engaging chamber through said second fluid passage is prevented.

3. A torque converter according to claim 2, further including a lock-up clutch control valve operable to control the difference between said pressures of the working fluid in said engaging and releasing chambers, and wherein said lock-up clutch control valve has a first position for permitting said discharge flow of the working fluid from said engaging chamber through said second fluid passage when said lock-up clutch is placed in said slipping state, and a second position for preventing said discharge flow when said lock-up clutch is placed in said fully engaged state.

4. A torque converter according to claim 1, further including:

a flow control device operable to control a rate of flow of the working fluid into said engaging chamber through said first fluid passage;

slipping-speed calculating means for calculating a slipping speed of said lock-up clutch which is a difference between rotating speeds of said clutch piston and said front cover when said lock-up clutch is placed in said slipping state;

engine-torque estimating means for estimating a torque of an engine connected to said front cover; and flow-rate adjusting means for controlling said flow control device to adjust the rate of flow of the working fluid into said engaging chamber through said first fluid passage, on the basis of the slipping speed calculated by said slipping-speed calculating means and the torque of the engine estimated by said engine-torque estimating means, and according to a predetermined relationship between said rate of flow and said slipping speed and said torque of the engine, said predetermined relationship being determined such that said rate of flow increases with at least one of said slipping speed and said toque of the engine.

5. A torque converter according to claim 1, further including a lock-up clutch switching valve which has a position for fluid communication of said first and second fluid passages with a cooler when said lock-up clutch is placed in a fully released state in which said clutch piston is spaced apart from said friction member, said lock-up clutch being placed in said fully released state with a supply flow of the working fluid into said releasing chamber and discharge flows of the working fluid from said engaging chamber through said first and second fluid passages.

6. A torque converter according to claim 1, wherein said pump impeller and said stator cooperate with each other to define therebetween said first fluid passage, while said stator and said turbine hub cooperate with each other to define therebetween said second fluid passage.

* * * * *